United States Patent
Cao et al.

(10) Patent No.: US 11,641,633 B1
(45) Date of Patent: May 2, 2023

(54) SYNCHRONIZATION OF JOINT TRANSMISSIONS WITH MULTIPLE ACCESS POINTS

(71) Applicant: Marvell Asia Pte, Ltd., Singapore (SG)

(72) Inventors: Rui Cao, Sunnyvale, CA (US); Sudhir Srinivasa, Los Gatos, CA (US); Hongyuan Zhang, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 112 days.

(21) Appl. No.: 17/014,966

(22) Filed: Sep. 8, 2020

Related U.S. Application Data

(60) Provisional application No. 62/897,120, filed on Sep. 6, 2019.

(51) Int. Cl.
  *H04W 56/00* (2009.01)
  *H04L 5/00* (2006.01)
  *H04W 72/044* (2023.01)
  *H04W 84/12* (2009.01)

(52) U.S. Cl.
  CPC ....... *H04W 56/0045* (2013.01); *H04L 5/0032* (2013.01); *H04W 56/001* (2013.01); *H04W 72/044* (2013.01); *H04W 84/12* (2013.01)

(58) Field of Classification Search
  CPC .................................................. H04W 56/0045
  See application file for complete search history.

(56) References Cited

U.S. PATENT DOCUMENTS

| | | |
|---|---|---|
| 9,166,660 B2 | 10/2015 | Chu et al. |
| 2011/0128947 A1* | 6/2011 | Liu .................. H04L 25/03343 370/338 |
| 2011/0261708 A1 | 10/2011 | Grandhi |
| 2019/0123863 A1 | 4/2019 | Zhang et al. |
| 2019/0182714 A1 | 6/2019 | Chu et al. |
| 2019/0182863 A1 | 6/2019 | Chu et al. |

(Continued)

OTHER PUBLICATIONS

IEEE Std 802.11—REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

(Continued)

*Primary Examiner* — Jason E Mattis

(57) ABSTRACT

A first access point (AP) generates and transmits a first physical layer (PHY) data unit for initiating a joint channel sounding procedure between a group of APs, including the first AP and one or more second APs, and one or more client stations. The first PHY data unit is generated to indicate that the first PHY data unit is of joint channel sounding type. The first AP generates and transmits a second PHY data unit for initiating synchronous data transmissions by the group of APs. The second PHY data unit is generated to indicate that the second PHY data unit is of a joint data transmission type. The synchronous data transmissions initiated by the second PHY data unit are steered using beamforming parameters determined based on the joint sounding procedure. A synchronous data transmission by a second AP is adjusted based on the relative timing offset.

18 Claims, 8 Drawing Sheets

(56) References Cited

U.S. PATENT DOCUMENTS

| | | | |
|---|---|---|---|
| 2019/0349930 A1 | 11/2019 | Chu et al. | |
| 2019/0373568 A1 | 12/2019 | Ram et al. | |
| 2020/0137704 A1* | 4/2020 | Vermani | H04L 5/0053 |
| 2020/0274588 A1* | 8/2020 | Jiang | H04B 7/0626 |
| 2020/0305164 A1* | 9/2020 | Yang | H04W 4/00 |
| 2020/0358486 A1* | 11/2020 | Suh | H04B 7/0452 |
| 2021/0045151 A1* | 2/2021 | Chen | H04L 69/22 |
| 2021/0307099 A1* | 9/2021 | Ryu | H04W 76/11 |

OTHER PUBLICATIONS

IEEE P802.11 ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

Zhang et al., "EHT Technology Candidate Discussions," doc: IEEE 802.11-18/1161r0, *The Institute of Electrical and Electronics Engineers, Inc.*, pp. 1-10 Jul. 8, 2018.

* cited by examiner

| PHY Preamble 510 | PHY data 540-1 | Midamble 612 | PHY data portion 540-2 | Postamble 614 |

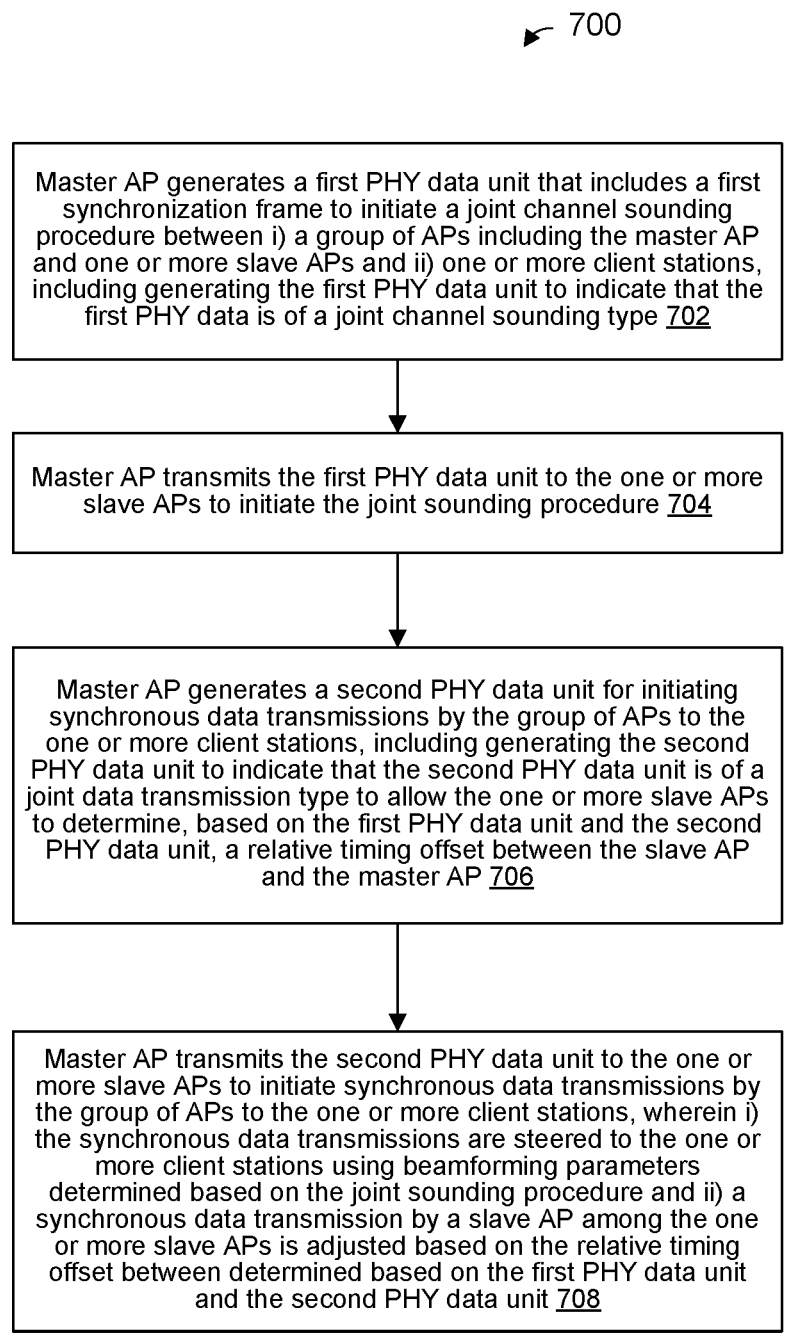

SYNCHRONIZATION OF JOINT TRANSMISSIONS WITH MULTIPLE ACCESS POINTS

CROSS REFERENCES TO RELATED APPLICATIONS

This application claims the benefit of U.S. Provisional Patent Application No. 62/897,120, entitled "Extreme High Throughput (EHT) Multi-Access Point Sync Frame Design," filed on Sep. 6, 2019, which is hereby incorporated herein by reference in its entirety.

FIELD OF TECHNOLOGY

The present disclosure relates generally to wireless communication systems, and more particularly to synchronization of joint transmissions by multiple access points in a wireless communication system.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit joint transmissions of data from a group of multiple access points (APs) to a client station, for example to increase throughput that achievable throughput when only a single AP transmits data to a client station at any given time.

SUMMARY

In an embodiment, a method for wireless communication by a first access point (AP) in joint communications involving multiple APs includes: generating, at the first AP, a first physical layer (PHY) data unit for initiating a joint channel sounding procedure between i) a group of APs including the first AP and one or more second APs and ii) one or more client stations, including generating the first PHY data unit to indicate that the first PHY data unit is of joint channel sounding type; transmitting, by the first AP, the first PHY data unit to the one or more second APs to initiate the joint sounding procedure; generating, at the first AP, a second PHY data unit for initiating synchronous data transmissions by the group of APs to the one or more client stations, including generating the second PHY data unit to indicate that the second PHY data unit is of a joint data transmission type to allow the one or more second APs to determine, based on the first PHY data unit and the second PHY data unit, a relative timing offset between the second AP and the first AP; and transmitting, by the first AP, the second PHY data unit to the one or more second APs to initiate synchronous data transmissions by the group of APs to the one or more client stations, wherein i) the synchronous data transmissions are steered to the one or more client stations using beamforming parameters determined based on the joint sounding procedure and ii) a synchronous data transmission by a second AP among the one or more second APs is adjusted based on the relative timing offset determined based on the first PHY data unit and the second PHY data unit.

In another embodiment, a first access point (AP) comprises a wireless network interface device comprising one or more integrated circuit (IC) devices configured to: generate a first physical layer (PHY) data unit that for initiating a joint channel sounding procedure between i) a group of APs including the first AP and one or more second APs and ii) one or more client stations, the one or more IC devices being configured to generate the first PHY data unit to indicate that the first PHY data unit is of a joint channel sounding type; control the wireless network interface device to transmit the first PHY data unit to the one or more second APs to initiate the joint sounding procedure; generate a second PHY data unit for initiating synchronous data transmissions by the group of APs to the one or more client stations, the one or more IC devices being configured to generate the second PHY data unit to indicate that the second PHY data unit is of a joint data transmission type to allow the one or more second APs to determine, based on the first PHY data unit and the second PHY data unit, a relative timing offset between the second AP and the first AP; and control the wireless network interface device to transmit the second PHY data unit to the one or more second APs to initiate synchronous data transmissions by the group of APs to the one or more client stations, wherein i) the synchronous data transmissions are steered to the one or more client stations using beamforming parameters determined based on the joint sounding procedure and ii) a synchronous data transmission by a second AP among the one or more second APs is adjusted based on the relative timing offset determined based on the first PHY data unit and the second PHY data unit.

BRIEF DESCRIPTION OF THE DRAWINGS

Figure 3:
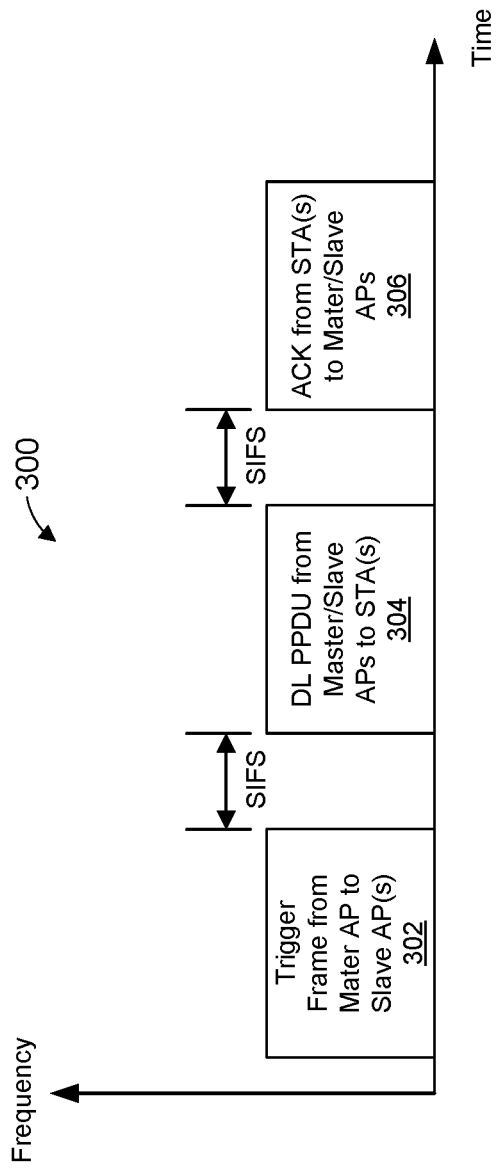
FIG. 3 is a diagram of an example joint data transmission sequence implemented by the communication system of FIG. 1A, according to an embodiment.

FIG. 6 is yet another example synchronization PHY data unit that is used with the joint sounding sequence of FIG. 2 and/or the joint data transmission sequence of FIG. 3, according to yet another embodiment.

FIG. 7 is a flow diagram of an example method for method for wireless communication by a first AP in joint communications involving multiple APs, according to an embodiment.

DETAILED DESCRIPTION

In various embodiments described below, multiple access points (APs) jointly transmit data to one or more client stations. For example, a first AP transmits data to a client station via one or more antennas of the first AP jointly with transmission of data to the client station by one or more second APs via respective antennas of the one or more second APs. Jointly transmitting data to a client station by multiple APs increases throughput due to beamforming gain and transmit power gain relative to transmission of data by only a single AP, in at least some embodiments. To implement joint transmissions by multiple APs, a joint sounding procedure with a client station is performed to determine beamforming parameters to be used for joint data transmissions by the multiple APs to the client station. A joint data transmission is then initiated to cause the multiple APs to synchronously transmit data to the client station, where beamforming parameters determined based on the sounding procedure are used to steer the joint data transmissions from the multiple APs to the client station. To enable synchronous joint transmission by the multiple APs and to achieve beamforming gain in the joint data transmissions by the multiple APs, the multiple APs generally need to be synchronized (e.g., clocks of the multiple APs need to be synchronized) to within a certain offset. Moreover, relative offsets between the APs need to be maintained between sounding packet transmissions from the multiple APs and the subsequent data transmissions by the multiple APs.

In various embodiments, synchronization data units transmitted in the sounding procedure and the initiation of the joint data transmission are formatted to provide sufficient amount of time for APs to determine timing offsets, and adjust transmissions based on the timing offsets, for joint data transmissions initiated by the synchronization data unit.

Figure 1A:
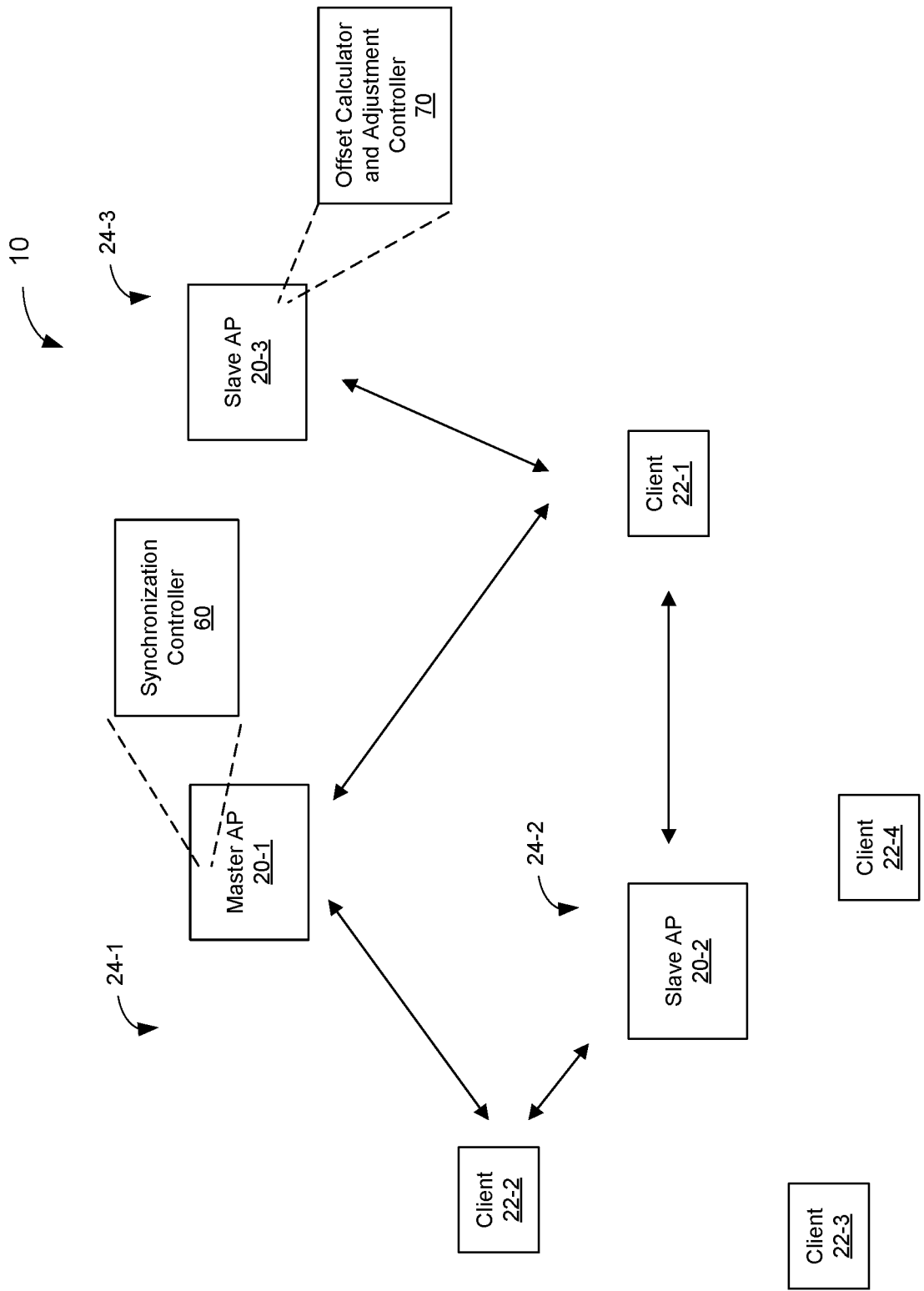
FIG. 1A is a block diagram of an example communication system that includes multiple access points (APs) that participate in joint transmissions, according to an embodiment.

FIG. 1A is a diagram of an example communication system 10 that includes multiple access points (APs) 20 and one or more client stations 22. In the embodiment of FIG. 1A, respective ones of the multiple APs 20 correspond to respective WLANs 24. In another embodiment, two or more of the multiple APs 20 correspond to a same WLAN 24. Although three APs 20 are illustrated in FIG. 1A, the communication system 10 includes other suitable numbers of APs such as two, four, five, etc., in various embodiments.

The APs 20 are configured to jointly transmit data to one or more client stations 22 using respective spatial streams. For example, APs 20-1, 20-2 and 20-3 may jointly transmit data to the client station 22-1 using respective spatial streams, in an embodiment. As another example, APs 20-1 and 20-2 may jointly transmit data to the client station 22-2 using respective spatial streams, in an embodiment. In an embodiment, the APs 20 jointly sound respective communication channels between the APs and a client station 22 and determine respective beamforming parameters to be applied to joint transmissions to the client station 22. Subsequently, the APs 20 simultaneously transmit data to the client station 22 using the respective beamforming parameters to steer their respective transmissions to the client station 22. In an embodiment, the APs 20 are configured to synchronize transmissions such that all APs 20 that are to jointly transmit to the client station 22 are synchronized in carrier frequency, phase and time to which a certain offset. Moreover, the APs 20 are configured to perform synchronization to ensure that relative timing offsets between the APs that are to jointly transmit to the client station 22 remain at least substantially the same between the time of a channel sounding transmission to a client station 22 (or an uplink channel sounding transmission by the client station 22 is triggered) and a subsequent data transmission to the client 22 is performed.

The AP 20-1 acts as a master AP and APs 20-2 and 20-3 act as slave APs, in an embodiment. The master AP 20-1 coordinates synchronized joint transmissions from the APs 20 to a client station 22 (e.g., the client station 22-2) and allows slave APs 20-2 and 20-3 to adjust frequency, phase and/or timing such that relative offsets remain at least substantially the same between the times when communication channel sounding and data transmission to the client 22 are performed, as will be described in more detail below. For example, the master AP 20-1 transmits synchronization data units (e.g., trigger or announcement frames) to trigger simultaneous transmission of sounding packets from the APs 20 to the client station 22. The client station 22 receives the sounding packets and determines channel feedback information based on the sounding packets. The client station 22 then transmits the channel feedback information to the APs 20. Subsequently, the master AP 20-1 transmits a trigger frame to prompt simultaneous transmission of jointly steered data packets to the client station 22. The APs 20 then simultaneously transmit data packets to the client station 22 while applying beamforming parameters determined based on the feedback received from the client station 22 to jointly steer the data packet transmissions to the client station 22.

In an embodiment, to provide slave APs 20-2, 20-3 a sufficient amount of time to calculate offset parameters based on successive synchronization data units (e.g., successive trigger frames) transmitted from the mater AP 20-1 to the slave APs 20-2, 20-3, the master AP 20-1 generates the successive packets to include early indication that the packets are to be used for offset calculation and/or includes padding and/or additional fields (e.g., midamble and/or postamble fields) in the packets that are to be used for offset calculations.

The master AP 20-1 comprises a synchronization controller 60 that generates data units (e.g., trigger data units) that initiate joint transmissions by the APs 20 in a manner that provides the slave APs 20-2, 20-3 a sufficient amount of time to calculate offset parameters and to adjust timing of data transmissions by the slave APs 20-2, 20-3 to synchronize transmissions with the master AP 20-1. In an embodiment, the synchronization controller 60 generates the packets to provide the slave APs 20-2, 20-3 a sufficient amount of time to calculate offset parameters, and to adjust transmissions based on the calculated offset parameters, to achieve sufficient synchronization for joint transmissions by APs 20. For example, the synchronization controller 60 generates the synchronization data units to include early indications that the synchronization data units are types of data units that are used for synchronization by the slave APs 20-2, 20-3 and to indicate the specific types of the synchronization data units, in an embodiment. Additionally or alternatively, the synchronization controller 60 generates the packets to include padding and/or extra fields (e.g., postamble and/or midamble fields) to allow more processing time at the APs 20-2, 20-3. In other embodiments, the synchronization controller 60 utilizes other suitable techniques to generate the packets to provide the slave APs 20-2, 20-3 a sufficient amount of time to calculate offset parameters, and to adjust transmissions based on the calculated offset parameters.

Each of the slave AP 20-2, 20-3 comprises an offset estimation and adjustment controller 70 that receives synchronization units transmitted by the master AP 20-1, determines types of the received synchronization data units, performs calculations to determine offsets based on the received synchronization data units, adjusts phase, frequency and/or timing of joint transmissions based on the determined offsets, etc., according to various embodiments. The offset estimation and adjustment controller 70 is described in more detail below.

Figure 1C:
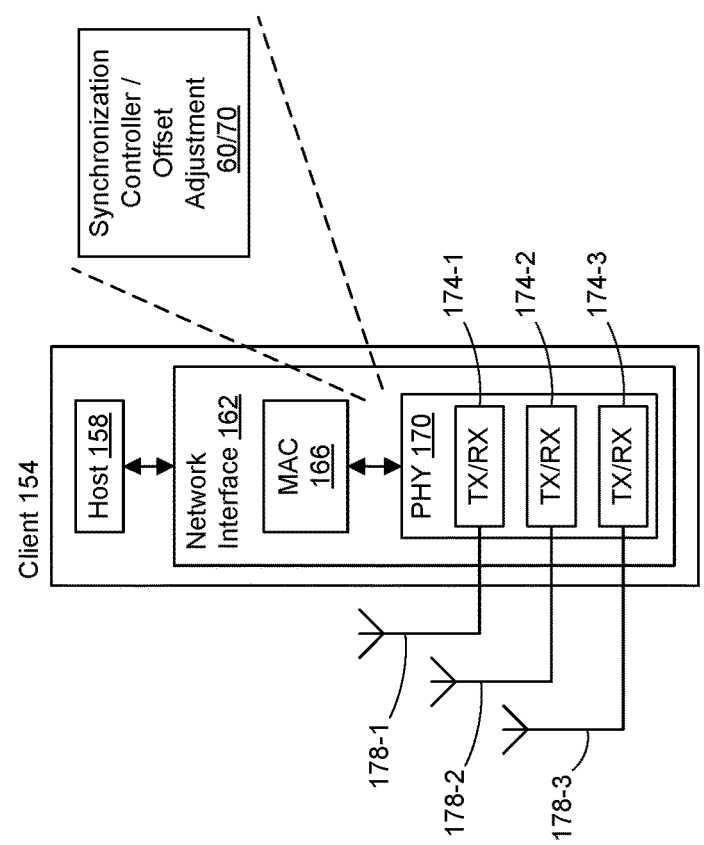
FIG. 1C is a block diagram of an example client station in the communication system of FIG. 1A, according to an embodiment.
Figure 1B:
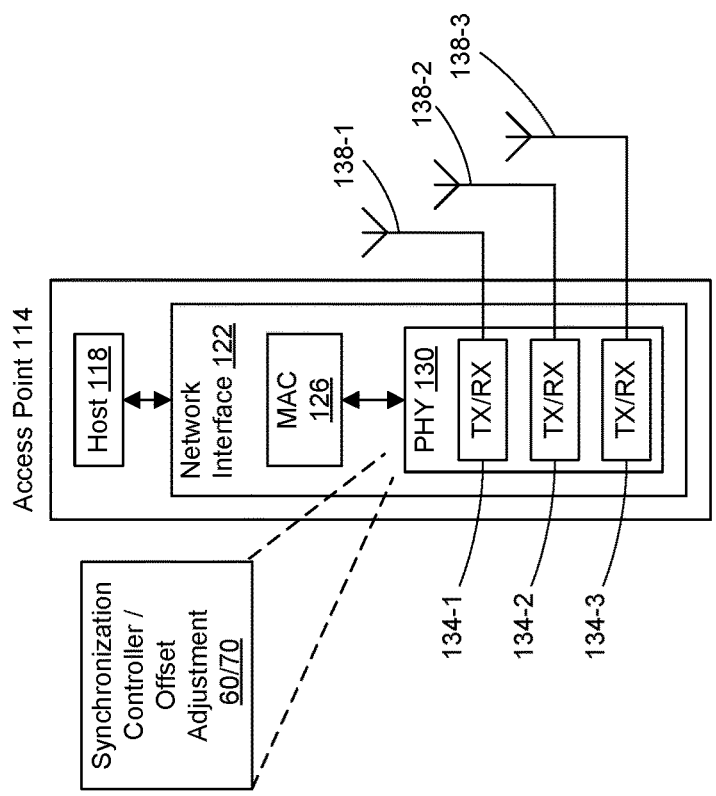
FIG. 1B is a block diagram of an example AP in the communication system of FIG. 1A, according to an embodiment.

FIG. 1B is a block diagram of an example AP 114 that may be used as the master AP 20-1 and/or the slave AP 20-2, 20-3, in various embodiments. In some embodiments, the AP 114 is configured to operate as a master AP at some times, and a slave AP at other times. A master AP generally transmits synchronization data units, such as trigger frames, to one or more slave APs that allow the one or more slave APs to synchronize transmissions with the master AP. On the other hand, a slave AP generally receive synchronization data units, such as trigger frames, from the master AP and utilize the synchronization data units to measure offsets needed to adjust subsequent transmissions of the slave AP so the transmissions are synchronized with transmissions of the master AP.

The AP 114 comprises a host processor 118 coupled to a wireless network interface device 122. The wireless network interface device 122 includes one or more medium access control (MAC) processors 126 (sometimes referred to herein as "the MAC processor 126" for brevity) and one or more physical layer (PHY) processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the wireless network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130, according to some embodiments. The PHY processor 130 is configured to receive MAC layer data units from the MAC processor 126 and encapsulate the MAC layer data units to generate PHY data units such as PHY protocol data units (PPDUs) for transmission via the antennas 138, according to some embodiments. Similarly, the PHY processor 130 is configured to receive PHY data units that were received via the antennas 138, and extract MAC layer data units encapsulated within the PHY data units, according to some embodiments. The PHY processor 130 provides the extracted MAC layer data units to the MAC processor 126, which processes the MAC layer data units, according to some embodiments.

PHY data units are sometimes referred to herein as "packets", and MAC layer data units are sometimes referred to herein as "frames".

In connection with generating one or more RF signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., that are not shown in FIG. 1B for purposes of brevity.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes the synchronization controller 60 and/or the offset estimation and adjustment controller 70 of FIG. 1A. In some embodiments, the synchronization controller 60 is configured to generate synchronization data units to ensure that a slave AP will have sufficient amount of time to perform offset estimation and adjustment prior to transmission of a synchronized transmission that is prompted by the synchronization data unit transmitted by the master AP, as will be described in more detail below. In some embodiments, the offset estimation and adjustment controller 70 is configured to receive and process synchronization data units transmitted by a master AP, to calculate frequency, phase and/or timing offsets based on the synchronization data unit received from the master AP, and to utilize the offsets for adjusting synchronous transmissions with the master AP that are prompted by the synchronization data unit received from the master AP, as will be described in more detail below.

FIG. 1C is a block diagram of an example client station 154 that may be used as one or more of the client stations 22 of FIG. 1A, in various embodiments. In other embodiments, one or more of the client stations 22 have a suitable structure different than the client station 154. The client station 154 includes a host processor 158 coupled to a network interface device 162. The network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154 includes other suitable numbers (e.g., 1, 2, 4, 5, etc.) of transceivers 174 and antennas 178 in other embodiments. In some embodiments, the client station 154 includes a higher number of antennas 178 than transceivers 174, and antenna switching techniques are utilized.

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, etc., and provide the MAC layer data units to the PHY processor 170, according to some embodiments. The PHY processor 170 is configured to receive MAC layer data units from the MAC processor 166 and encapsulate the MAC layer data units to generate PHY data units such as PPDUs for transmission via the antennas 178, according to some embodiments. Similarly, the PHY processor 170 is configured to receive PHY data units that were received via the antennas 178, and extract MAC layer data units encapsulated within the PHY data units, according to some embodiments. The PHY processor 170 provides the extracted MAC layer data units to the MAC processor 166, which processes the MAC layer data units, according to some embodiments.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc., that are not shown in FIG. 1B for purposes of brevity.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor (not shown) configured to execute machine readable instructions stored in a memory device (not shown) such as a RAM, a ROM, a flash memory, etc. In an embodiment, the MAC processor 166 includes a hardware state machine (not shown).

Figure 2:
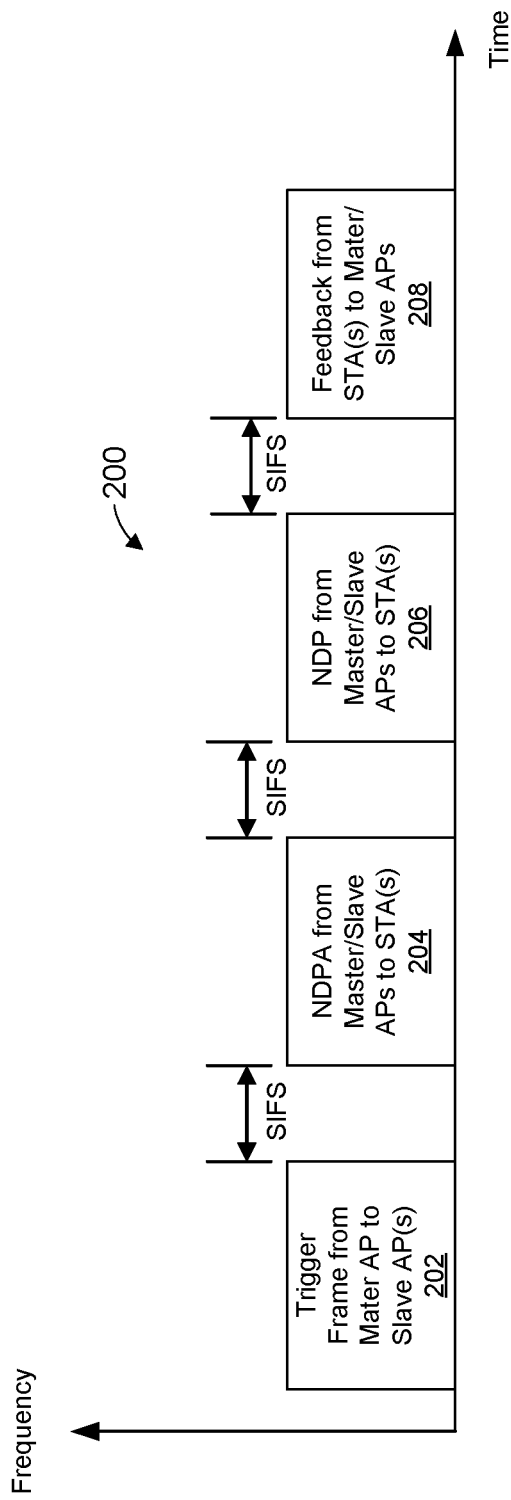
FIG. 2 is a diagram of an example joint sounding sequence implemented by the communication system of FIG. 1A, according to an embodiment.

FIG. 2 is a diagram of an example joint sounding sequence 200 in a communication system such as the communication system 10 of FIG. 1A, or another suitable communication system, according to an embodiment. FIG. 2 is described with reference to FIGS. 1A-C for explanatory purposes. In some embodiments, however, the joint sounding sequence 200 is implemented in other suitable communication systems and/or with suitable communication devices different than the example communication devices of FIGS. 1B-C.

A master AP (e.g., the master AP 20-1) generates and transmits a synchronization data unit 202 to one or more slave APs (e.g., the slave APs 20-2, 20-3). The synchronization data unit 202 includes a synchronization frame, such as a trigger frame or an announcement frame, to initiate a joint sounding procedure by a group of APs including the master AP and the one or more slave APs, in an embodiment. A defined time period after an end of the data unit 202, the master AP and the one or more slave APs jointly transmit respective null data packet announcement (NDPA) data units 204 to announce the sounding procedure to one or more client stations (e.g., the client station 22-1) that are to participate in the sounding procedure. The defined time interval after an end of the NDPA data unit 204, the master AP and the one or more slave APs jointly transmit respective null data packet (NDP) data units 206 to the one or more client stations. In an embodiment, the defined time period is a short interframe space (SIFS) as defined by the IEEE 802.11 Standard. In other embodiments, another suitable time period is utilized.

The NDP data units 206 include training signals (e.g., one or more training fields) that allow the one or more client stations to accurately estimate the communication channel between the client station and the group of APs. The one or more client stations receive the NDP data units 206 and determine channel estimates based on the training signals included in the NDP data units 206, in an embodiment. The one or more client stations then transmit respective feedback packets 208 to the group of APs to provide the channel estimates, on some form, to the group of APs. Based on the channel estimates provided in the feedback packets 208, the master AP and the one or more slave APs determine beamforming parameters to be used for steering one or more subsequent joint data transmissions from the group of APs to the one or more client stations, in an embodiment.

In another embodiment, the synchronization data unit 202 triggers transmission of respective trigger packets to trigger transmission of uplink NDP data packets by the one or more client stations. In response to receiving the trigger packets from the group of APs, the one or more client stations transmit uplink NDP data units to the group of APs to allow the APs to accurately determine estimates of the communication channel based on training signals included in the NDPs. The master AP and the one or more slave APs then determine beamforming parameters to be used for steering one or more subsequent joint data transmissions from the group of APs to the one or more client stations based on channel estimates determined, based on the uplink NDPs, by the APs, in this embodiment.

FIG. 3 is a diagram of an example joint data transmission sequence 300 in a communication system such as the communication system 10 of FIG. 1A, or another suitable communication system, according to an embodiment. In an embodiment, the joint data transmission sequence 300 follows the joint sounding sequence 200 of FIG. 2 and utilizes beamforming parameters determined in the joint sounding procedure described above with reference to FIG. 2. FIG. 3 is described with reference to FIGS. 1A-C and FIG. 2 for explanatory purposes. In some embodiments, however, the joint data transmission sequence 300 is implemented in other suitable communication systems and/or with suitable communication devices different than the example communication devices of FIGS. 1B-C and/or utilizes beamforming parameters determined using a channel sounding procedure different from the channel sounding procedure of FIG. 2.

The master AP (e.g., the master AP 20-1) generates and transmits a synchronization data unit 302 to the one or more slave APs (e.g., the slave APs 20-2, 20-3). The synchronization data unit 302 includes a synchronization frame, such as a trigger frame, to initiate a joint data transmission from the group of APs, including the master AP and the one or more slave APs, to the one or more client stations (e.g., the client station 22-1), in an embodiment. A defined time period after an end of the data unit 302, the master AP and the one or more slave APs jointly transmit respective PHY data units 304 that include data for the one or more client stations. In an embodiment, the defined time period is a short interframe space (SIFS) as defined by the IEEE 802.11 Standard. In other embodiments, another suitable time period is utilized. In response to receiving the PHY data units 304 jointly transmitted to the one or more client stations 22 by the group of APs 20, the one or more client stations 22 transmit respective acknowledgement data units 306 to the group of APs 20 to acknowledge successful receipt of the PHY data units 304, in an embodiment.

In an embodiment, the one or more slave APs utilize training signals (e.g., one or more training fields) included in the synchronization data unit 202 (FIG. 2) and the synchronization data unit 302 to calculate a relative timing offset between the slave AP and the mater AP, and adjust timing of transmission of the data unit 304 by the relative timing offset, to ensure that transmission of the data unit 304 from the slave AP is offset from the defined time period by a same timing offset relative to the master AP as transmission of the NDP from the slave AP to the one or more client stations, or transmission of a trigger data unit that triggered transmission of uplink NDPs to the slave AP from the one or more client stations.

In an embodiment, to provide a sufficient amount of time for a slave AP to calculate the relative timing offset and to perform timing adjustment prior to transmission of the data unit 304 to the one or more client station 22, the master AP generates the synchronization data unit 202 and the synchronization data unit 302 to include an early indication of a synchronization data unit type of the synchronization data unit 302 and/or to include additional fields, such as padding, midamble and/or postamble fields in the synchronization data unit 302, as will be discussed in more detail below. As will also be discussed in more detail below, in an embodiment, the master AP generates the synchronization data unit 202 and the synchronization data unit 302 to further include an identifier of the master AP to allow the slave AP to determine that the synchronization data unit 202 and the synchronization data unit 302 are synchronization data units from the same master AP and should be used for determining the relative timing offset with the master AP. In an embodiment, when the slave AP receives the synchronization data unit 202 that initiates the sounding procedure in FIG. 2, the slave AP saves, in a memory, channel sounding information, such as training signals (e.g., long training field (LTF) samples) included in the synchronization data unit 202 and/or channel state information determined based on the training signals included in the synchronization data unit 202. In an embodiment, the slave AP saves the channel sounding information in response to determining that the synchronization data unit 202 is of a joint channel sounding type. For example, the slave AP determines (e.g., the PHY processor 130 determines) that the synchronization data unit 202 is of a joint channel sounding type based on an early indication provided in a PHY preamble of the synchronization data unit 202. In another embodiment, the slave AP saves the channel sounding information without determining that the synchronization data unit 202 is of a joint channel sounding type, for example when the synchronization data unit 202 does not provide an early indication of the synchronization data unit type (e.g., when the synchronization data unit type is instead provided in a later portion of the synchronization data unit 202 such as a MAC header of a synchronization frame included in a data portion of the synchronization data unit 202). In an embodiment, the slave AP additionally saves an identifier of the master AP included in the synchronization data unit 202 (e.g., included in the PHY preamble and/or the MAC header of the synchronization data unit 202.

Subsequently, when the slave AP receives the synchronization data unit 302, the slave AP determines a relative timing offset based on i) training signals (e.g., long training field (LTF) samples) included in the synchronization data unit 302 and/or channel state information determined based on the training signals included in the synchronization data unit 302 and ii) the stored channel sounding information, such as the training signals (e.g., long training field (LTF) samples) that were included in the synchronization data unit 202 and/or channel state information that was determined based on the training signals included in the synchronization data unit 202. In an embodiment, the slave AP determines the relative timing offset in response to determining (e.g., based on a synchronization data unit type indication provided in a PHY preamble of the synchronization data unit 302 and/or a MAC header of a synchronization frame included in a data portion of the synchronization data unit 302) that the synchronization data unit 302 is of a joint data transmission type. In an embodiment, the slave AP determines the relative timing offset further in response to determining (e.g., based on an identifier corresponding to the master AP provided in the PHY preamble of the synchronization data unit 302 and/or the MAC header of the synchronization frame included in the data portion of the synchronization data unit 302) that the synchronization data unit 302 was transmitted by the same master AP as the synchronization data unit 202. The slave AP utilizes the determined relative timing offset to advance or delay transmission of the data unit 304 by the determined timing offset from the defined time period (e.g., SIFS time period) after the end of the synchronization data unit 302, in an embodiment.

Figure 4:
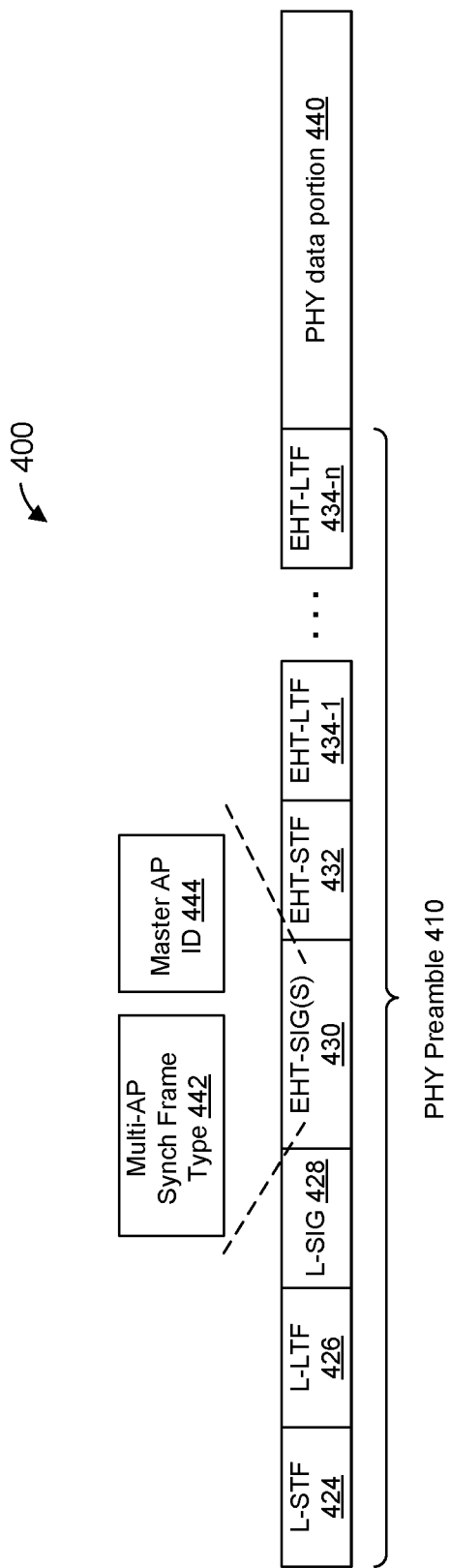
FIG. 4 is an example synchronization physical layer (PHY) data unit that is used with the joint sounding sequence of FIG. 2 and/or the joint data transmission sequence of FIG. 3, according to an embodiment.

FIG. 4 is a diagram of an example synchronization PPDU 400, according to an embodiment. In an embodiment, the master AP 20 (FIG. 1) is configured to (e.g., the network interface device 122 is configured to, the PHY processor 130 is configured to, the synchronization controller 146 is configured to, etc.) generate and transmit the PPDU 400 to one or more slave APs. In an embodiment, the synchronization PPDU 400 corresponds to one or more data units in the joint sounding sequence 200 (FIG. 2) and/or the joint data transmission sequence 300 (FIG. 3). For example, the synchronization PPDU 400 corresponds to the synchronization data unit 202 (FIG. 2) and/or the synchronization data unit 302 (FIG. 3), in an embodiment.

The PPDU 400 includes a PHY preamble 410 which, in turn, includes a legacy PHY preamble portion (sometimes referred to as a legacy preamble), a non-legacy PHY preamble portion (sometime referred to as a EHT preamble), and a PHY data portion 440. The legacy preamble comprises a legacy short training field (L-STF) 424, a legacy long training field (L-LTF) 428, and a legacy signal field (L-SIG) 432. In an embodiment, the STFs 424 and the LTFs 428 are used for packet detection, automatic gain control (AGC), frequency offset estimation, channel estimation, etc. The L-SIG 432 includes a rate subfield (not shown) and a length subfield (not shown) that together indicate a duration of the PPDU 400. The EHT preamble includes one or more EHT signal fields 430, an EHT STF field 432 and one or more EHT LTF fields 434.

In an embodiment, the PHY data portion 440 of the PPDU 400 includes a synchronization frame generated by a network interface device (e.g., generated by the network interface device 122/162, generated by the MAC processor 126/166, generated by the synchronization controller 60, etc.), and the PHY preamble of the PPDU 400 is generated to indicate a synchronization data unit type of the PPDU 400 (e.g., a type of the synchronization frame included in the PHY data portion 440 of the PPDU 400). For example, the EHT SIGs 430 are generated to include a multi-AP synchronization indication subfield 442, in some embodiments. The multi-AP synchronization indication subfield 442 comprises two bits, including a first bit to indicate that the PPDU 400 is a multi-AP joint transmission synchronization data unit that includes a synchronization frame and a second bit to indicate a synchronization data unit type of the synchronization PPDU 400, for example whether the synchronization PPDU 400 is of a joint channel sounding type or a joint data transmission type, in an embodiment. In another embodiment, the multi-AP synchronization indication subfield 442 includes one or more additional bits to indicate a synchronization data unit type of the synchronization PPDU 400 from among a number of possible synchronization data unit types that is greater than two synchronization data unit types. For example, the multi-AP synchronization indication subfield 442 includes two bits for indicating a synchronization data unit type of the synchronization PPDU 400, the two bits set to indicate whether the synchronization PPDU 400 is of a joint channel sounding type, a joint data transmission without midamble type, or a joint data transmission with a midamble type, in an embodiment.

In another embodiment, the multi-AP synchronization indication subfield 442 comprises only a single bit to indicate a synchronization data unit type of the synchronization PPDU 400, for example whether the synchronization PPDU 400 is of a joint channel sounding type or a joint data transmission type. The indication that the PPDU 400 is a multi-AP joint transmission synchronization data unit is provided implicitly, for example by rotation of modulation of one or more OFDM symbols in the PHY preamble 410. In some embodiments, the synchronization data unit type of the synchronization PPDU 400 is implicitly signaled, for example by modulation rotation of an OFDM symbol of an EHT-LTF 534. The EHT SIGs 430 are generated to omit the multi-AP synchronization indication subfield 442, in some such embodiments.

The EHT SIGs 430 are generated to further include a multi-AP identification (ID) subfield 444, in an embodiment. The multi-AP identification (ID) subfield 444 identifies the master AP 20-1, or the group of APs that includes the master AP 20-1, to enable a slave AP to identify successive synchronization data units that are transmitted by a same master AP. In an embodiment, the multi-AP identification (ID) subfield 444 includes a basic service set (BSS) color associated with the master AP 20-1. In another embodiment, the EHT SIGs 430 include a BSS color field that indicates a BSS color associated with the master AP 20-1. In this embodiment, the BSS color field is used as the identifier of the master AP 20-1 and the multi-AP ID subfield 444 is omitted from the PPDU 400.

Figure 5:
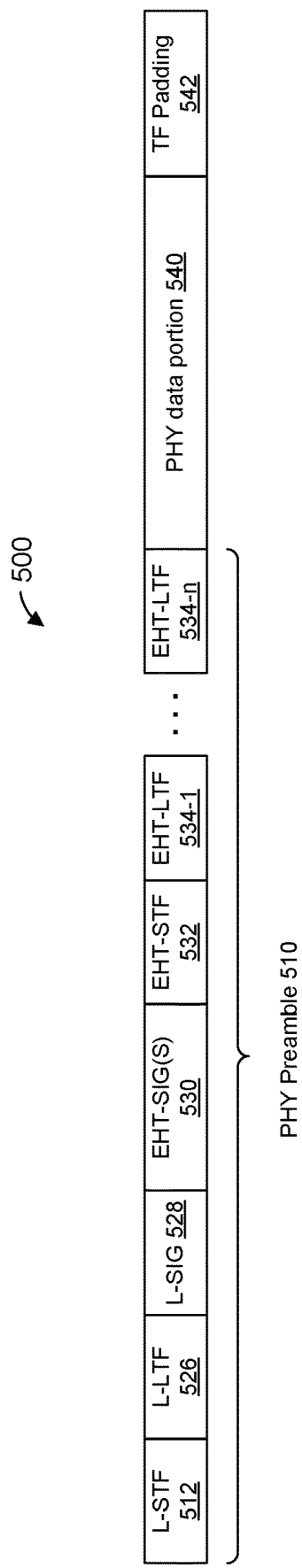
FIG. 5 is another example synchronization PHY data unit that is used with the joint sounding sequence of FIG. 2 and/or the joint data transmission sequence of FIG. 3, according to another embodiment.

FIG. 5 is a diagram of an example synchronization PPDU 500, according to an embodiment. In an embodiment, the master AP 20 (FIG. 1) is configured to (e.g., the network interface device 122 is configured to, the PHY processor 130 is configured to, the synchronization controller 146 is configured to, etc.) generate and transmit the synchronization PPDU 500 to one or more slave APs. In an embodiment, the synchronization PPDU 500 corresponds to one or more data units in the joint sounding sequence 200 (FIG. 2) and/or the joint data transmission sequence 300 (FIG. 3). For example, the synchronization PPDU 500 corresponds to the synchronization data unit 202 (FIG. 2) and/or the synchronization data unit 302 (FIG. 3), in an embodiment.

The PPDU 500 is similar to the PPDU 400 of FIG. 4 and includes like-numbered elements with the PPDU 400 of FIG. 4 that are not described for brevity. The PPDU 500 does not include multi-AP synchronization indications in a PHY preamble 510, according to an embodiment. Instead, multi-AP synchronization indications (e.g., an indication of a synchronization data unit type of the synchronization PPDU 500 included in the PHY data portion 540 of the PPDU 500, an indication of an identifier associated with the master AP 20-1, etc.) are included in a MAC header of the synchronization frame included in the PHY data portion 540 of the PPDU 500, in an embodiment. Additionally, a padding field 542 is included in the PPDU 500 to provide sufficient amount of time for the slave APs 20 to calculate offset parameters based on the PPDU 500 after determining the synchronization unit type based on the indication included in the MAC header, in an embodiment.

In an embodiment, the PHY preamble 510 (e.g., the EHT SIG field 530) includes a duration indication to indicate a duration of the padding field 540. In yet another embodiment, the PHY preamble 510 (e.g., the EHT SIG field 530) includes a duration indication to indicate a duration of the synchronization data unit included padding field 540 In another embodiment, the PHY preamble 510 (e.g., the EHT SIG field 530) includes a duration indication to indicate a number of OFDM symbols of the padding field 540.

FIG. 6 is a diagram of an example synchronization PPDU 600, according to another embodiment. In an embodiment, the master AP 20 (FIG. 1) is configured to (e.g., the network interface device 122 is configured to, the PHY processor 130 is configured to, the synchronization controller 146 is configured to, etc.) generate and transmit the synchronization PPDU 600 to one or more slave APs. In an embodiment, the synchronization PPDU 600 corresponds to one or more data units in the joint sounding sequence 200 (FIG. 2) and/or the joint data transmission sequence 300 (FIG. 3). For example, the synchronization PPDU 600 corresponds to the synchronization data unit 202 (FIG. 2) and/or the synchronization data unit 302 (FIG. 3), in an embodiment.

The PPDU 600 is similar to the PPDU 400 of FIG. 4 and includes like-numbered elements with the PPDU 400 of FIG. 4 that are not described for brevity. In an embodiment, the PPDU 600 includes one or more midamble fields 612 and/or postamble fields 614. In an embodiment, the PPDU 600 is generated to provide an indication of a synchronization data unit type of the PPDU 600, and, in some embodiments, an identifier of the master AP 20 that transmits the PPDU 600, in the PHY preamble 510 and/or in a MAC header included in the first PHY data portion 540-1. The one or more postamble fields 614 are generated to provide sufficient amount of time for the slave APs 20 to calculate offset parameters based on the PPDU 600 after determining the synchronization data unit type and, in some embodiments, determining that the PPDU 600 was transmitted by the master AP 20. The one or more midamble fields 612 and/or postamble fields 614 include additional training signals, in some embodiments. For example, one or more midamble fields 612 and/or postamble fields 614 include one or more repetitions of the EHT-LTF field 534, in an embodiment. In some embodiments, a slave AP utilizes the training signals in the one or more midamble fields 612 and/or postamble fields 614 to perform additional fine tuning, such as carrier frequency offset (CFO) tuning, for pre-compensating subsequent joint data transmissions by the slave AP.

FIG. 7 is a flow diagram of another example method 700 for wireless communications involving multiple APs, according to another embodiment. The method 700 is implemented by a master AP having a structure such as described with reference to FIG. 1B, and FIG. 7 is described with reference to FIG. 1B for ease of explanation. In other embodiments, however, the method 700 is implemented by an AP having a suitable structure different than illustrated in FIG. 1B.

In various embodiments, the method 702 is utilized in connection with any of the transmission sequences and data unit formats discussed in connection with any of FIGS. 2-6, and/or in connection with any of the techniques discussed above.

At block 702, a first AP generates (e.g., the network interface 122 generate, the MAC processor 126 generate, the controller 60 generates, etc.) a first physical layer (PHY) data unit for initiating a joint channel sounding procedure between i) a group of APs including the first AP and one or more second APs and ii) one or more client stations. In an embodiment, the first data unit is a joint sounding synchronization data unit such as the data unit 202 of FIG. 2. In another embodiment, the first data unit is a suitable data unit different from the data unit 202 of FIG. 2. Generating the first PHY data unit includes generating the first PHY data unit to indicate that the first PHY data unit is of a joint channel sounding type.

At bock 704, the first AP transmits the first PHY data unit to the one or more second APs to initiate the joint sounding procedure.

At block 706 the first AP generates a second PHY data unit for initiating synchronous data transmissions by the group of APs to the one or more client stations. In an embodiment, the second PHY data unit is a joint data transmission synchronization data unit such as the data unit 302 of FIG. 3. In another embodiment, the first data unit is a suitable data unit different from the data unit 302 of FIG. 3. Generating the second PHY data unit includes generating the second PHY data unit to indicate that the second PHY data unit is of a joint data transmission type to allow the one or more second APs to determine, based on the first PHY data unit and the second PHY data unit, a relative timing offset between the second AP and the first AP.

At block 708, the first AP transmits the second PHY data unit to the one or more second APs to initiate synchronous data transmissions by the group of APs to the one or more client stations, wherein i) the synchronous data transmissions are steered to the one or more client stations using beamforming parameters determined based on the joint sounding procedure and ii) a synchronous data transmission by a second AP among the one or more second APs is adjusted based on the relative timing offset determined based on the first PHY data unit and the second PHY data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication by a first access point (AP) in joint communications involving multiple APs, the method comprising:
generating, at the first AP, a first physical layer (PHY) data unit for initiating a joint channel sounding procedure between i) a group of APs including the first AP and one or more second APs and ii) one or more client stations, including generating the first PHY data unit to include in a first PHY preamble of the first PHY data unit a) a first training signal, and b) an indication that the first training signal is to be used by each of one or more second APs for determining a relative timing offset between the first AP and the second AP in connection with synchronous data transmissions by the group of APs;
transmitting, by the first AP, the first PHY data unit to the one or more second APs to initiate the joint sounding procedure;
generating, at the first AP, a second PHY data unit for initiating synchronous data transmissions by the group of APs to the one or more client stations, including generating the second PHY data unit to include in a second PHY preamble of the second PHY data unit i) a second training signal, and ii) an indication that each of the one or more second APs is to determine the relative timing offset between the first AP and the second AP using a) the first training signal in the first PHY preamble of the first PHY data unit and b) the second training signal in the second PHY preamble of the second PHY data unit; and
transmitting, by the first AP, the second PHY data unit to the one or more second APs to initiate synchronous data transmissions by the group of APs to the one or more client stations, wherein i) the synchronous data transmissions are steered to the one or more client stations using beamforming parameters determined based on the joint sounding procedure and ii) a synchronous data transmission by a second AP among the one or more second APs is adjusted based on the relative timing offset determined based on a) the first training signal in the first PHY preamble of the first PHY data unit and b) the second training signal in the second PHY preamble of the second PHY data unit.

2. The method of claim 1, wherein
generating the first PHY data unit incudes generating the first PHY data unit to further include an identifier corresponding to the first AP, and
generating the second PHY data unit incudes generating the second PHY data unit to further include the identifier corresponding to the first AP.

3. The method of claim 2, wherein generating the first PHY data unit to include an identifier corresponding to the first AP comprises generating the first PHY data unit to include one or more of i) one or more bits of a basic service set (BSS) color associated with the first AP, ii) a master AP identifier associated with the first AP and iii) a joint group identifier associated with the group of APs including the first AP and the one or more second APs.

4. The method of claim 1, wherein generating the second PHY data unit to include the indication that each of the one or more second APs is to determine the relative timing offset between the first AP and the second AP using a) the first training signal in the first PHY preamble of the first PHY data unit and b) the second training signal in the second PHY preamble of the second PHY data unit comprises rotating modulation of a field of the second PHY preamble of the second PHY data unit to indicate that each of the one or more second APs is to determine the relative timing offset between the first AP and the second AP using a) the first training signal in the first PHY preamble of the first PHY data unit and b) the second training signal in the second PHY preamble of the second PHY data unit.

5. The method of claim 1, wherein generating the second PHY data unit comprises generating the second PHY data unit to include a padding field to provide the one or more second APs sufficient time to adjust the relative timing offset prior to the synchronous data transmissions by the group of APs, wherein the synchronous data transmissions by the group of APs are to be initiated a predetermined time interval after an end of the second PHY data unit.

6. The method of claim 5, wherein generating the second PHY data unit comprises generating the second PHY data unit to further include, in the second PHY preamble of the second PHY data unit, an indication of a duration of the padding field.

7. The method of claim 1, wherein generating the second PHY data unit comprises generating the second PHY data unit to include one or both of i) midamble or ii) postamble to provide the one or more second APs sufficient time to adjust the relative timing offset prior to the synchronous data transmissions by the group of APs, wherein the synchronous data transmissions by the group of APs are to be initiated a predetermined time interval after an end of the second PHY data unit.

8. The method of claim 1, wherein generating the second PHY data unit comprises generating the second PHY data unit to include one or both of midamble and postamble to provide the one or more second APs sufficient time to adjust the relative timing offset prior to the synchronous data transmissions by the group of APs, wherein the synchronous data transmissions by the group of APs are to be initiated a predetermined time interval after an end of the second PHY data unit.

9. The method of claim 8, wherein generating the second PHY data unit comprises including one or more training fields in the one or both of midamble and postamble.

10. A first access point (AP) comprising:
a wireless network interface device comprising one or more integrated circuit (IC) devices configured to:
generate a first physical layer (PHY) data unit that for initiating a joint channel sounding procedure between i) a group of APs including the first AP and one or more second APs and ii) one or more client stations, the one or more IC devices being configured to generate the first PHY data unit to include in a first PHY preamble of the first PHY data unit a) a first training signal, and b) an indication that the first training signal is to be used by each of one or more second APs for determining a relative timing offset between the first AP and the second AP in connection with synchronous data transmissions by the group of APs, control the wireless network interface device to transmit the first PHY data unit to the one or more second APs to initiate the joint sounding procedure, generate a second PHY data unit for initiating synchronous data transmissions by the group of APs to the one or more client stations, the one or more IC devices being configured to generate the second PHY data unit to include in a second PHY preamble of the second PHY data unit i) a second training signal, and ii) an indication that each of the one or more second APs is to determine the relative timing offset between the first AP and the second AP using a) the first training signal in the first PHY preamble of the first PHY data unit and b) the second training signal in the second PHY preamble of the second PHY data unit, and control the wireless network interface device to transmit the second PHY data unit to the one or more second APs to initiate synchronous data transmissions by the group of APs to the one or more client stations, wherein i) the synchronous data transmissions are steered to the one or more client stations using beamforming parameters determined based on the joint sounding procedure and ii) a synchronous data transmission by a second AP among the one or more second APs is adjusted based on the relative timing offset determined based on a) the first training signal in the first PHY preamble of the first PHY data unit and b) the second training signal in the second PHY preamble of the second PHY data unit.

11. The first AP of claim 10, wherein the one or more IC devices are further configured to generate the first PHY data unit to further include an identifier corresponding to the first AP, and generate the second PHY data unit to further include the identifier corresponding to the first AP.

12. The first AP of claim 11, wherein the one or more IC devices are configured to generate the first PHY data unit to include one or more of i) one or more bits of a basic service set (BSS) color associated with the first AP, ii) an identifier of associated with the first AP and iii) a joint group identifier associated with the group of APs including the first AP and the one or more second APs.

13. The first AP of claim 10, wherein the one or more IC devices are configured to generate the second PHY data unit to include the indication that each of the one or more second APs is to determine the relative timing offset between the first AP and the second AP using a) the first training signal in the first PHY preamble of the first PHY data unit and b) the second training signal in the second PHY preamble of the second PHY data unit at least by rotating modulation of a field of the second PHY preamble of the second PHY data unit to indicate that each of the one or more second APs is to determine the relative timing offset between the first AP and the second AP using a) the first training signal in the first PHY preamble of the first PHY data unit and b) the second training signal in the second PHY preamble of the second PHY data unit.

14. The first AP of claim 10, wherein the one or more IC devices are configured to generate the second PHY data unit to include a padding field to provide the one or more second APs sufficient time to adjust the relative timing offset prior to the synchronous data transmissions by the group of APs, wherein the synchronous data transmissions by the group of APs are to be initiated a predetermined time interval after an end of the second PHY data unit.

15. The first AP of claim 14, wherein the one or more IC devices are configured to generate the second PHY data unit to further include, in the second PHY preamble of the second PHY data unit, an indication of a duration of the padding field.

16. The first AP of claim 10, wherein the one or more IC devices are configured to generate the second PHY data unit to include one or both of i) midamble or ii) postamble to provide the one or more second APs sufficient time to adjust the relative timing offset prior to the synchronous data transmissions by the group of APs, wherein the synchronous data transmissions by the group of APs are to be initiated a predetermined time interval after an end of the second PHY data unit.

17. The first AP of claim 10, wherein the one or more IC devices are configured to generate the second PHY data unit to include one or both of midamble and postamble to provide the one or more second APs sufficient time to adjust the relative timing offset prior to the synchronous data transmissions by the group of APs, wherein the synchronous data transmissions by the group of APs are to be initiated a predetermined time interval after an end of the second PHY data unit.

18. The first AP of claim 17, wherein the one or more IC devices are configured to generate the second PHY data unit to include one or more training fields in the one or both of midamble and postamble.

* * * * *